United States Patent
Persson et al.

(10) Patent No.: US 9,058,764 B1
(45) Date of Patent: Jun. 16, 2015

(54) MARKERS TO IMPLEMENT AUGMENTED REALITY

(75) Inventors: Carl J. Persson, Olathe, KS (US); Thomas H. Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2228 days.

(21) Appl. No.: 11/948,655

(22) Filed: Nov. 30, 2007

(51) Int. Cl.
G09G 5/00 (2006.01)
G09G 5/14 (2006.01)

(52) U.S. Cl.
CPC .......................................... G09G 5/14 (2013.01)

(58) Field of Classification Search
USPC .................................................. 345/629, 633
See application file for complete search history.

(56) References Cited

U.S. PATENT DOCUMENTS

| | | | | |
|---|---|---|---|---|
| 6,166,744 | A * | 12/2000 | Jaszlics et al. | 345/629 |
| 6,937,255 | B2 * | 8/2005 | Fukuda et al. | 345/633 |
| 7,391,424 | B2 * | 6/2008 | Lonsing | 345/633 |
| 7,671,875 | B2 * | 3/2010 | Anabuki et al. | 345/633 |
| 8,542,906 | B1 | 9/2013 | Persson et al. | |
| 2002/0010734 | A1 | 1/2002 | Ebersole et al. | |
| 2002/0075286 | A1 * | 6/2002 | Yonezawa et al. | 345/679 |
| 2002/0149581 | A1 | 10/2002 | Furlong et al. | |
| 2003/0080978 | A1 * | 5/2003 | Navab et al. | 345/633 |
| 2005/0253870 | A1 * | 11/2005 | Kotake et al. | 345/633 |
| 2006/0038833 | A1 * | 2/2006 | Mallinson et al. | 345/633 |
| 2006/0071945 | A1 * | 4/2006 | Anabuki | 345/633 |
| 2007/0008341 | A1 * | 1/2007 | Endo et al. | 345/633 |
| 2007/0091125 | A1 * | 4/2007 | Takemoto et al. | 345/633 |
| 2007/0242899 | A1 * | 10/2007 | Satoh et al. | 382/286 |
| 2013/0141468 | A1 | 6/2013 | Coon | |

OTHER PUBLICATIONS

Persson, Carl J., et al., Patent Application entitled "Augmented Reality Image Offset and Overlay," filed May 21, 2008, U.S. Appl. No. 12/124,826.
Office Action dated Jul. 11, 2011, U.S. Appl. No. 12/124,826, filed May 21, 2008.
Final Office Action dated Nov. 8, 2011, U.S. Appl. No. 12/124,826, filed May 21, 2008.
Notice of Allowance dated May 13, 2013, U.S. Appl. No. 12/124,826, filed May 21, 2008.
Bell, Timothy L., et al. Patent Application entitled "System and Method of Augmenting Reality," filed Nov. 26, 2013, U.S. Appl. No. 14/090,657.
Katzer, Robin D., et al. Patent Application entitled "Voice Call Using Augmented Reality" filed Dec. 20, 2013. U.S. Appl. No. 14/137,369.
Office Action dated Feb. 1, 2013, U.S. Appl. No. 12/124,826, filed May 21, 2008.

* cited by examiner

*Primary Examiner* — M Good Johnson

(57) ABSTRACT

A method is provided for markers to implement augmented reality. An image is captured of an environment. A plurality of markers is detected in the image of the environment. A virtual image is displayed overlaid on the image of the environment, wherein the virtual image is based on a combination of the plurality of markers.

9 Claims, 7 Drawing Sheets

MARKERS TO IMPLEMENT AUGMENTED REALITY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Augmented reality (AR) is a field of computer applications which deals with the combination of real world images and computer generated data. Many augmented reality applications are concerned with the use of live video imagery which is digitally processed and augmented by the addition of computer generated graphics. For instance, an augmented reality user may wear translucent goggles through which the user may see the real world as well as computer-generated images projected on top of that real world. An example of augmented reality is the yellow first-down line seen in television broadcasts of American football games. In this example, the real-world elements are the football field and players, and the virtual element is the yellow line which is drawn over the image by computers in real time.

In another example, virtual chess pieces may be overlaid on top of an empty chess board that is depicted as a camera image. The computer that overlays the virtual chess pieces must know where the camera is relative to the chess board in order to know how to augment the image correctly. One way to achieve this is through the use of markers, which may be a two dimensional bar code such as the circular shot code, or any asymmetrical pattern. Markers are put in the scene so that when these markers are recognized in the camera image, the computer rendering the virtual chess pieces knows the position and angle to render virtual chess pieces and draw them over the camera image so that the virtual chess pieces appear natural to the viewer looking at the camera image.

SUMMARY

In some embodiments, a method is provided for markers to implement augmented reality. An image is captured of an environment. A plurality of markers is detected in the image of the environment. A virtual image is displayed overlaid on the image of the environment, wherein the virtual image is based on a combination of the plurality of markers.

In other embodiments, a system is provided for markers to implement augmented reality. The system includes at least one processor, a camera associated with a mobile device, a plurality of instructions in a memory, and a user interface associated with the mobile device. The camera captures an image of an environment. The plurality of instructions, when executed by the at least one processor, detect at least one of a plurality of updateable digital markers in the image of the environment. The user interface displays a virtual image overlaid on the image of the environment, wherein the virtual image is based on the at least one of the plurality of updateable digital markers.

In still other embodiments, a method is provided for markers to implement augmented reality. An image is captured of an environment. A marker is detected in the image of the environment. A virtual image is displayed overlaid on the image of the environment, wherein the virtual image is based on the marker. The virtual image continues to be displayed when a portion of the marker is concealed from detection.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
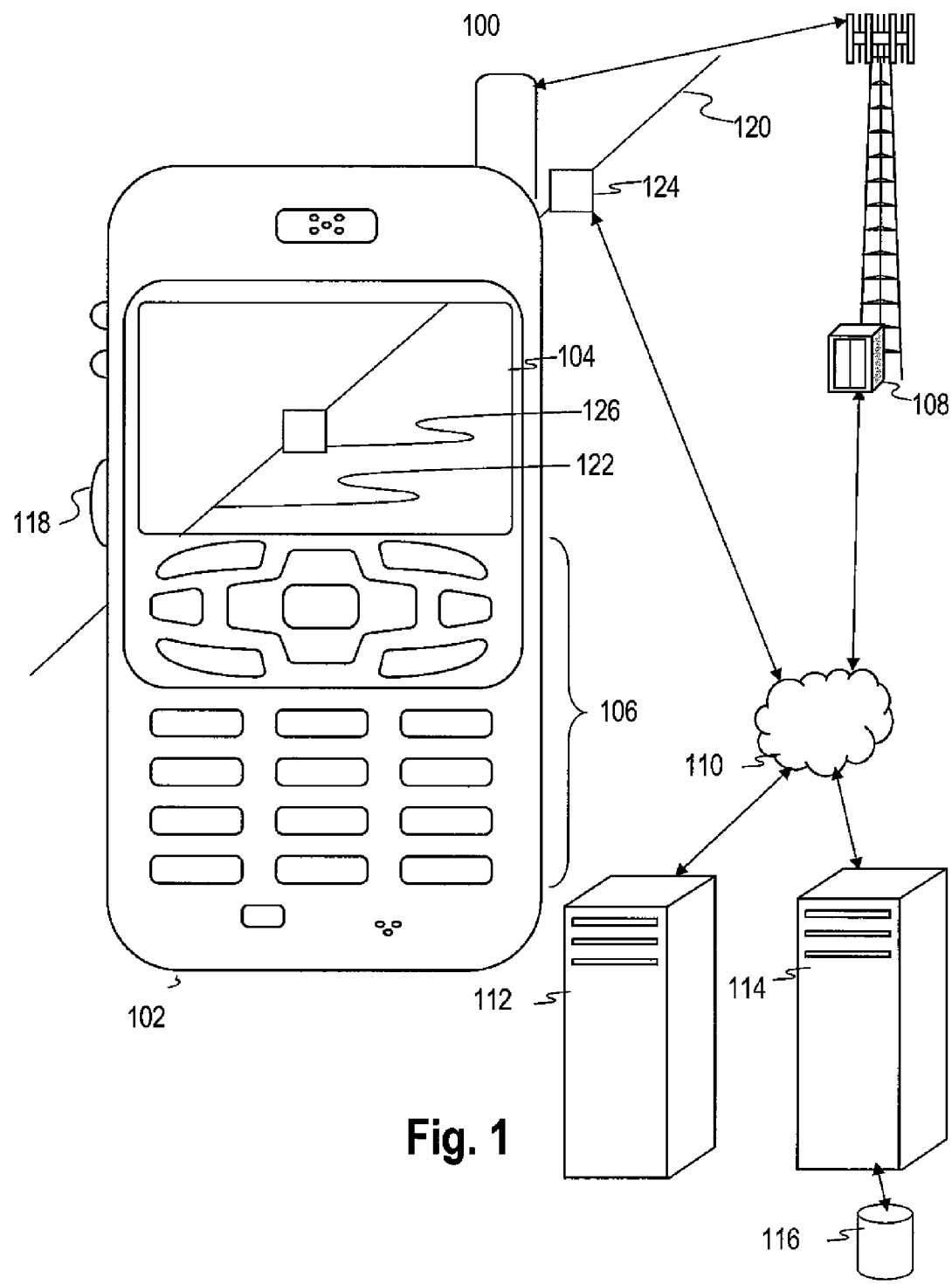
FIG. 1 shows an illustrative wireless communications system for markers to implement augmented reality according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In embodiments of the present disclosure, methods and systems are provided for markers to implement augmented reality. Some embodiments display virtual images based on combinations of markers. For example, a first marker corresponds to a virtual image of a refrigerator front, a second marker corresponds to a virtual image of a refrigerator side, and a third marker corresponds to a virtual image of a refrigerator top. When an image of any of these markers is captured by a mobile device camera individually in the marker's environment, a display on a mobile device may depict the corresponding virtual image on the image of the marker's environment. However, when images of multiple markers are captured simultaneously, for example when multiple markers are in the field of view of a mobile device camera, the display may depict a combination of virtual images corresponding to these markers. In this example, the mobile device may depict a virtual image of a refrigerator viewed from both the front and from one side in response to detecting the first marker and the second marker in the environment. Displaying virtual images based on combinations of markers may enable a mobile device user to virtually view an item as if the item was physically present, as if seeing all three dimensions of a refrigerator while walking around the refrigerator, for example. Displaying virtual images based on combinations may enable a retailer to provide customers with the experience of viewing numerous models of refrigerators by simply providing markers that correspond to the virtual images of the different models instead of incurring the expenses required to transport, store, maintain, and protect each of the models.

In some embodiments, virtual images are based on updateable digital markers rather than static markers. An updateable digital marker is similar to a static marker, except the updateable digital marker may change from displaying any marker to displaying any other marker. For example, a digital marker display for a children's cereal determines that a particular mobile device is nearby. The digital marker display may reference a mobile device user profile and determine that the user of the particular mobile device frequently purchases health-oriented cereal made by the same manufacturer, but never purchases children's cereal. In response to these determinations, the digital marker display may update its digital marker to display a digital marker that is associated with a virtual arrow that points from the children's cereal to the health-oriented cereal. In response, the user of the particular mobile device sees a virtual arrow pointing from the children's cereal to the health-oriented cereal in their mobile device display, instead of seeing the previously depicted virtual advertisement for the children's cereal. The digital marker display may slowly alternate between displays of different digital markers, such that a mobile device user sees a variety of alternating virtual images. For example, the mobile device user may see a virtual image of a cartoon character associated with the children's cereal, then a virtual image of a price discount for the cereal, and then the cartoon character again. The digital marker display may also rapidly alternate between displays of different digital markers, such that one mobile device user sees a virtual arrow while oriented towards the digital marker display and another mobile device user sees a virtual advertisement while oriented towards the same digital marker display.

In some embodiments, the mobile device display continues to display a virtual image even when a portion of the associated marker is blocked from the view of the mobile device's camera. Traditionally, if a portion of a marker is blocked from the view of a mobile device's camera, the mobile device can no longer recognize the marker.

FIG. 1 shows a wireless communications system 100 that illustrates the context for the present disclosure's systems and methods. The wireless communication system 100 includes an illustrative mobile device 102. Though illustrated as a mobile phone, the mobile device 102 may take various forms including a personal digital assistant (PDA), a mobile handset, a wireless mobile device, a pager, a mobile computer, a portable computer, a tablet computer, a laptop computer, a digital camera, a mobile phone or mobile telecommunication device, a handheld gaming device, a digital calculator, a digital music player, and a headset with goggles, lenses, glasses, or similar viewing devices. Many suitable mobile devices combine some or all of these functions.

The mobile device 102 includes a display 104 and a touch-sensitive surface or keys 106 with which a user can interact. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction, such as selecting from virtual image options.

In system 100, the mobile device 102 communicates through a base transceiver station 108 and a wired or wireless network 110 to access information on various servers, such as a communication server 112 and a content server 114. The content server 114 may provide content that may be shown on the display 104, such as virtual images. The content server 114 may access a database 116 of virtual images that may be shown on the display 104. The database 116 may include markers and virtual images, wherein each of the virtual images is associated with at least one of the markers. In some embodiments, the function of the content server 114 and the database 116 is incorporated in the mobile device 102 instead of in the content server 114 and the database 116 that communicate with the mobile device 102. While one base transceiver station 108 is shown in FIG. 1, other base transceiver stations 108 could be present.

The mobile device 102 includes a camera 118 that can capture images of an environment 120, whereby an image 122 of the environment 120 may be viewed through the display 104. In FIG. 1, the camera 118 is depicted on the side of the mobile device 102, but the camera 118 may be located anywhere on the mobile device 102, such as on the opposite side of the mobile device 102 from the display 104. When the environment 120 includes a marker 124, the image 122 of the environment 120 may include an image 126 of the marker 124. The marker 124 may be any of an asymmetrical pattern, a moving marker, a two dimensional bar code, a shot code, a SEMACODE, a color light pattern, a primary marker assigned to a marker hierarchy, a secondary marker assigned to the marker hierarchy, and/or a dependent marker assigned to the marker hierarchy. The color light pattern may be a combination of different colors of light that are arranged in a manner that uniquely identifies a marker. A marker hierarchy is a designated sequence in which virtual images are overlaid on markers, such as the hierarchy for markers described below in reference to boxes 408 and 504. If the marker 124 is displayed by an updateable digital marker display, the updateable digital marker display may communicate with the content server 114 and the database 116 via the network 110. Either the mobile device 102, and/or the content server 114 in conjunction with the database 116, may overlay a virtual image on the image 126 of the marker 124 in the image 122 of the environment 120 based on the marker 124 and the relative location of the marker 124 within the environment 120.

Figure 2:
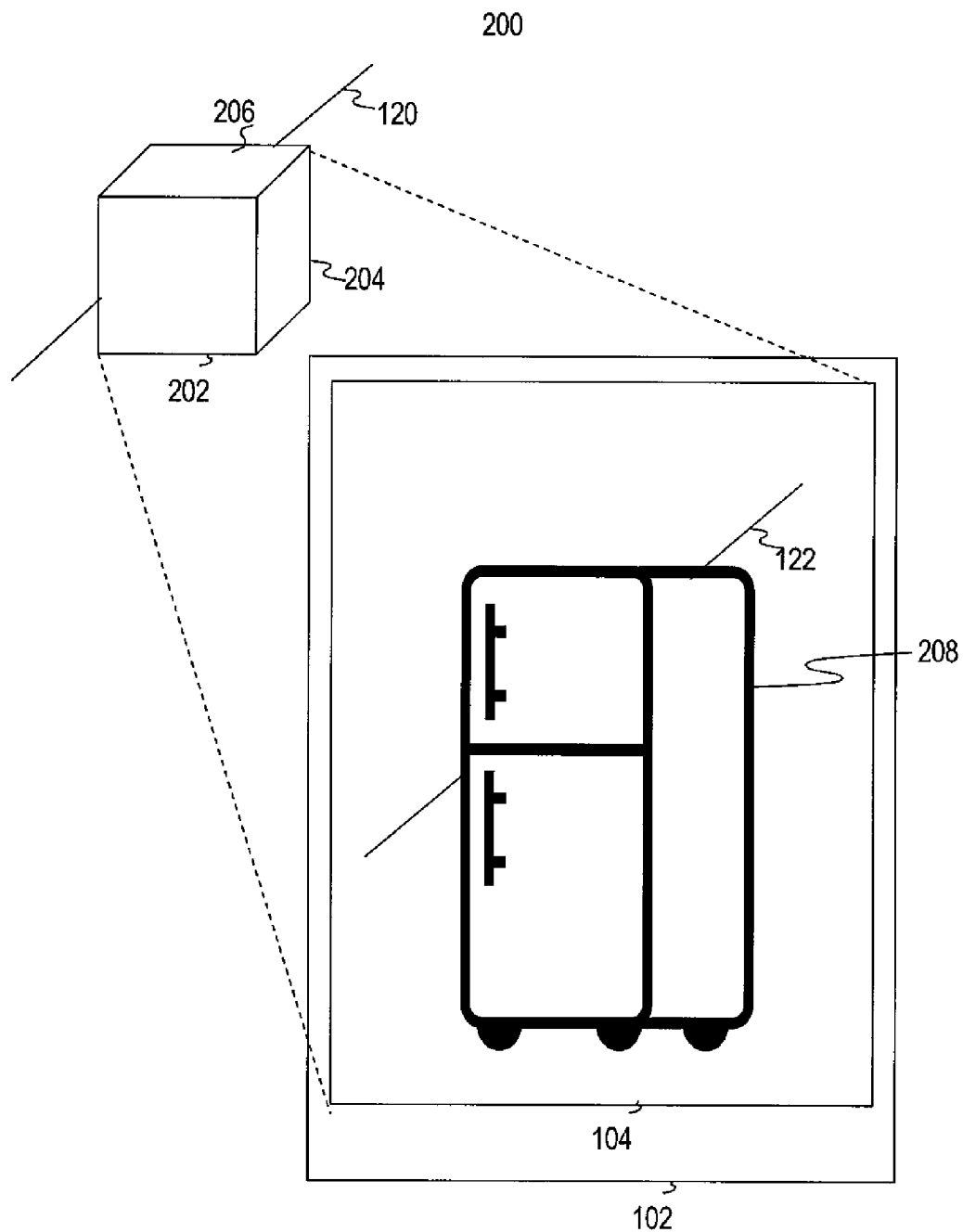
FIG. 2 shows a view of a system for markers to implement augmented reality according to some embodiments of the present disclosure.

FIG. 2 shows a view 200 of a system for markers to implement augmented reality according to some embodiments of the present disclosure. The view 200 includes the mobile device 102, the display 104, the environment 120, an image 122 of the environment 120, a first marker 202, a second marker 204, a third marker 206, and a virtual image 208. Either the mobile device 102, and/or the content server 114 in conjunction with the database 116, may overlay the virtual image 208 on the image 122 of the environment 120 based on the location of the mobile device 102, more specifically the camera 118 for the mobile device 102, in relation to the location of the markers 202-206 in the environment 120. The virtual image 208 may be an image, navigational information, an advertisement, information about an item in the image of the environment, or colors that indicate a level of matching.

For example, when the mobile device 102 is located such that the camera 118 only captures an image of the first marker 202, which may be a shot code. The mobile device 102 reads data-bits from the shot code, which is a dartboard-like circle, with a bullseye in the center and data-circles surrounding it, by measuring the angle and distance from the bullseye for each data-circle. The mobile device 102 communicates the data from the first marker 202 to the content server 114 via the network 110, and the content server 114 identifies a virtual image in the database 116 that corresponds to the first marker 202. The content server 114 communicates the corresponding virtual image to the mobile device 102 via the network 110, and the mobile device 102 overlays the virtual image of a refrigerator front view on the image 122 of the environment 120. The first marker 202 may be SEMACODE, which is a machine-readable dot matrix symbol that encodes an internet uniform resource locator (URL). An image of the SEMACODE may be captured by the camera 118 and decoded to obtain a web site address. The mobile device 102 may access this address via the mobile device's web browser to obtain the virtual image that corresponds to the first marker 202. In another example, when the mobile device 102 is located such that the camera 118 captures an image of the second marker 204 only, the mobile device 102 overlays a virtual image of a refrigerator side view on the image 122 of the environment 120. In yet another example, when the mobile device 102 is located such that the camera 118 captures an image of the third marker 206 only, the mobile device 102 overlays a virtual image of a refrigerator top view on the image 122 of the environment 120.

However, when the mobile device 102 is located such that the camera 118 captures the image of the first marker 202 and the image of the second marker 204, the mobile device 102 overlays the virtual image 208 of a refrigerator view on the image 122 of the environment 120, where the refrigerator view depicts perspectives of both the refrigerator front view and the refrigerator side view. If the mobile device 102 is located such that the camera 118 captures the image of the first marker 202, the image of the second marker 204, and the image of the third marker 206, the mobile device 102 overlays another virtual image of a refrigerator view on the image 122 of the environment 120, where the refrigerator view simultaneously depicts perspectives of the refrigerator front view, the refrigerator side view, and the refrigerator top view. In FIG. 2, the mobile device 102 overlays the virtual image 208 of a refrigerator view on the image 122 of the environment 120 over the image of the markers 202-206, such that the display 104 does not depict the markers 202-206 in the image 122 of the environment 120.

Figure 3:
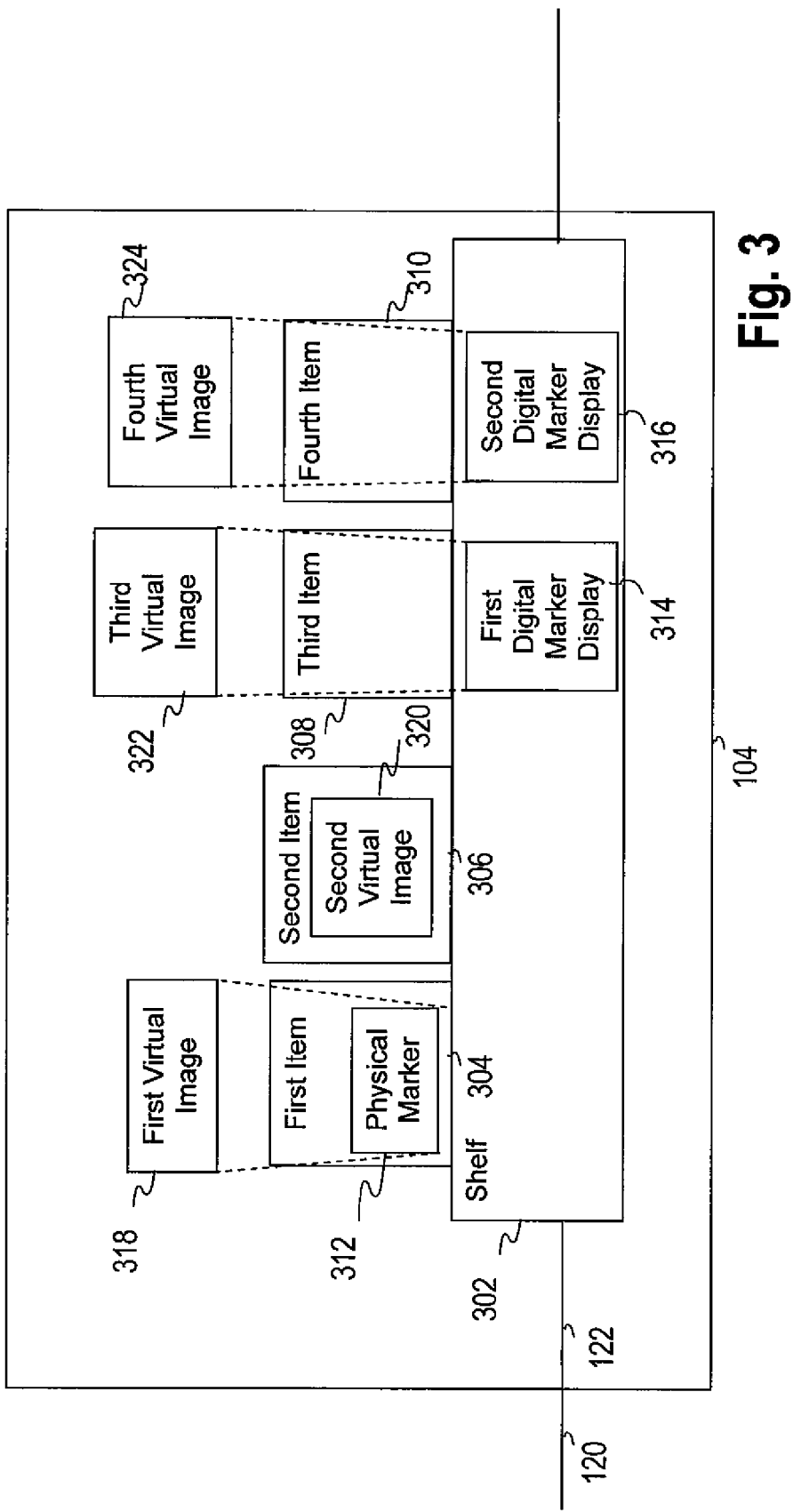
FIG. 3 shows a graphic user interface for markers to implement augmented reality according to some embodiments of the present disclosure.

FIG. 3 shows a graphic user interface for markers to implement augmented reality according to some embodiments of the present disclosure. In FIG. 3, the display 104 depicts the environment 120 by displaying the image 122 of the environment 120, which includes a shelf 302, items 304-310 on the shelf 302, a physical marker 312, digital marker displays 314 and 316, and virtual images 318-324. The mobile device 102, and/or the content server 114 in conjunction with the database 116, may overlay the virtual images 318-324 on the image 122 of the environment 120 based on the location of the mobile device 102, more specifically the camera 118 for the mobile device 102, in relation to the location of the physical marker 312 and the digital marker displays 314-316 in the environment 120.

For example, when the mobile device 102 is located such that the camera 118 captures an image of the physical marker 312, the mobile device 102 overlays the first virtual image 318 on the image 122 of the environment 120. The mobile device 102 may overlay the first virtual image 318 on the physical marker 312 or overlay the first virtual image 318 offset from the physical marker 312. In this example, if the first item 304 is a box of candy and the physical marker 312 is a trademarked pattern that is specific to the particular box of candy, the mobile device 102 overlays the first virtual image 318, which may be a price discount image for the candy, offset above the candy box.

In another example, when the mobile device 102 is located such that the camera 118 captures an image of another physical marker that is not depicted in FIG. 3, the mobile device 102 overlays the second virtual image 320 on the image 122 of the environment 120 on the other physical marker. In this example, if the second item 306 is a box of detergent and the other physical marker is a pattern specifically designed for the second virtual image 320 that corresponds to the box of detergent, the mobile device 102 overlays the second virtual image 320, which may be an advertisement for the detergent, on the other physical marker on the detergent box.

In yet another example, the mobile device 102 may overlay the third virtual image 322 on the image 122 of the environment 120 based on the location of the mobile device 102 in relation to the location of an updateable digital marker displayed by the first digital marker display 314 in the environment 120. In this example, if the first item 304 is a box of children's cereal and the first digital marker display 314 displays a pattern that is specific to the particular box of children's cereal, the mobile device 102 overlays the third virtual image 322, which may be a price discount image for the children's cereal, above the children's cereal box. When the first digital marker display 314 updates the updateable digital marker by displaying a different updateable digital marker, the mobile device 102 may overlay another virtual image instead of the third virtual image 322 on the image 122 of the environment 120 based on the different updateable digital marker. For example, if the first digital marker display 314 alternates between displaying a digital marker for a price discount image and a digital marker for an advertisement, the mobile device 102 may alternate between overlaying virtual images for the price discount and the advertisement on the image 122 of the environment 120 based on the different updateable digital markers.

In an additional example, the mobile device 102 may overlay the fourth virtual image 324 on the image 122 of the environment 120 based on the location of the mobile device 102 in relation to the location of an updateable digital marker displayed by the second digital marker display 316 in the environment 120. In this example, if the fourth item 310 is a box of health-oriented cereal and the second digital marker display 316 displays a pattern that is specific to the particular box of health-oriented cereal, the mobile device 102 overlays the fourth virtual image 324, which may be a discounted price image for the health-oriented cereal, above the health-oriented cereal box.

Figure 4:
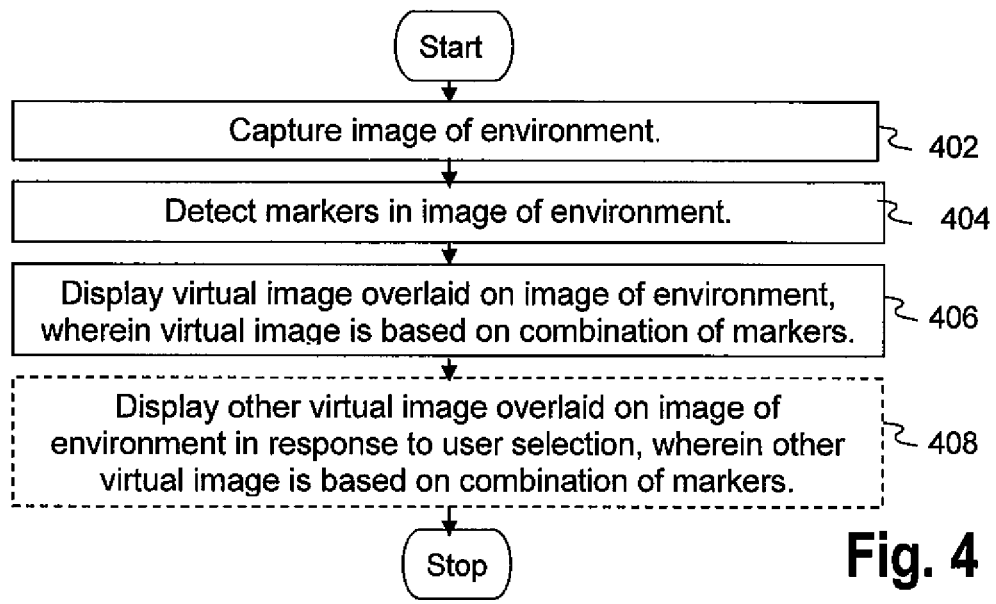
FIG. 4 shows a flowchart of a method for markers to implement augmented reality according to some embodiments of the present disclosure.

FIG. 4 shows a flowchart of a method for markers to implement augmented reality according to some embodiments of the present disclosure. The mobile device 102 can use the method to display virtual images based on a combination of markers.

In box 402, an image is captured of an environment. For example, the camera 118 captures the image 122 of the environment 120.

In box 404, a plurality of markers is detected in the image of the environment. For example, the mobile device 102 detects the markers 202 and 204 in the image of the environment 120.

In box 406, a virtual image is displayed overlaid on the image of the environment, wherein the virtual image is based on a combination of the plurality of markers. For example, the display 104 displays the virtual image 208 of a refrigerator overlaid on the image 122 of the environment 120, wherein the virtual image 208 of the refrigerator is based on a combination of the markers 202 and 204. Displaying a virtual image may include displaying an animated image based on a combination of markers. For example, the third virtual image 322 may be an animated cartoon character that is associated with the second item 306, which is the children's cereal.

In box 408, another virtual image is displayed overlaid on the image of the environment in response to a user selection, wherein the other virtual image is based on the combination of the plurality of markers. For example, the display 104 displays a virtual image of plumbing pipes overlaid on the image of service rooms in an office building in response to a user selection, wherein the virtual images of the plumbing pipes and service rooms are based on the combination of markers visible from the front of the office building. A portion of the front of the office building may serve as a primary marker for service rooms, while other portions of the front of the office building may serve as secondary markers for the plumbing pipes, the ventilation system, and electrical conduits. When the user views the image of the front of the office building, the mobile device 102 detects the secondary markers, but does not display virtual images associated with the secondary markers when the mobile device 102 is configured to display only the virtual images based on the primary marker. However, the mobile device 102 offers options via the display 104 for the user to select between displaying virtual images corresponding to any of the secondary markers. In this example, when the user selects to display the plumbing pipes, the mobile device 102 combines the primary marker for the service rooms with the secondary marker for the plumbing pipes to display virtual images of the service rooms and the plumbing pipes on the front of the office building so that the user may identify the location of various plumbing pipes and the service rooms to access the plumbing pipes.

In another example, the markers 202-206 may be primary markers associated with the front, side, and top views of a virtual refrigerator, while additional secondary markers located close to the marker 202 may be associated with the interior of the refrigerator. In this example, the user may select to display a view of the virtual refrigerator with one or both doors open, the mobile device 102 combines the primary markers 202-206 with one of the secondary markers for the refrigerator interior to display virtual images of the refrigerator such that the appearance of the interior of the refrigerator may also be evaluated.

The mobile device 102 may also detect dependent markers in the environment that may be selected for display to display a sub-portion of a virtual image associated with a secondary marker. For example, when the mobile device 102 displays a virtual image of the plumbing pipes on the image of the front of the office building, the mobile device 102 may also detect dependent markers and offer to let the user select between displaying only plumbing pipes associated with hot water or only plumbing pipes associated with sewage, with each sub-section based on a different dependent marker.

Figure 5:
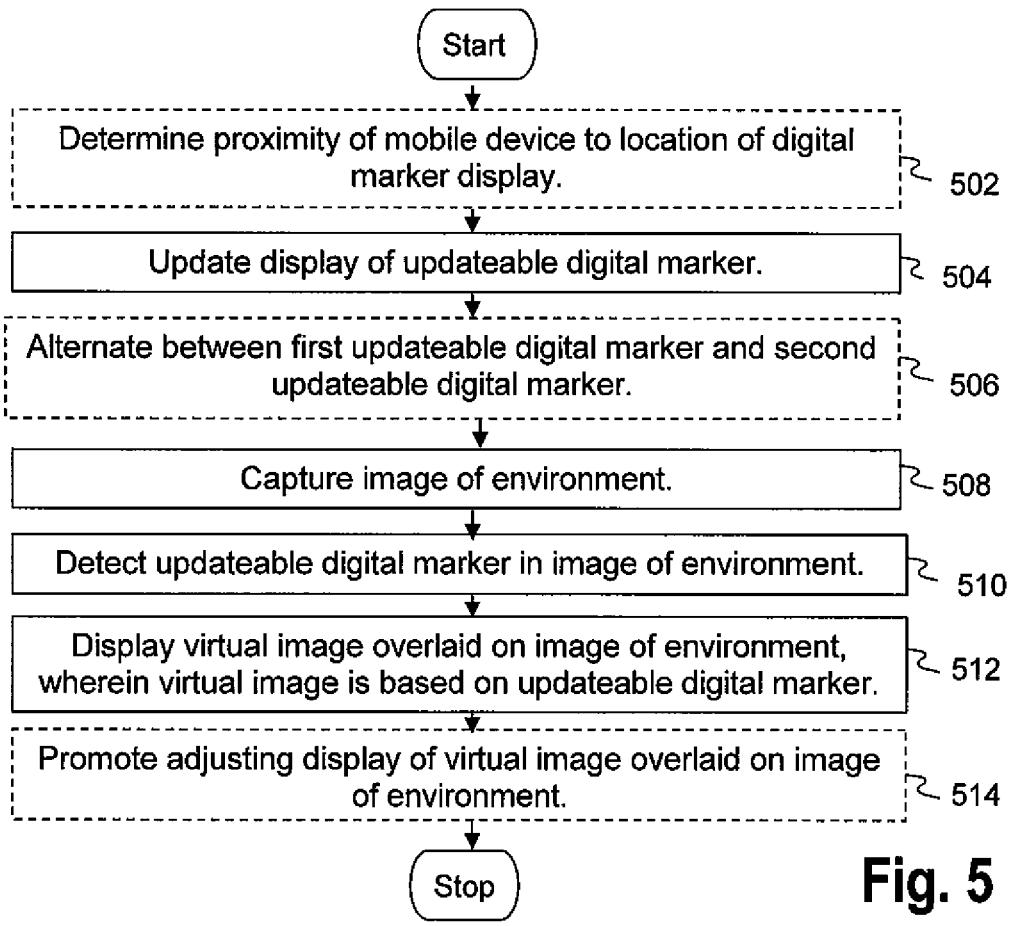
FIG. 5 shows another flowchart of a method for markers to implement augmented reality according to some embodiments of the present disclosure.

FIG. 5 shows another flowchart of a method for markers to implement augmented reality according to some embodiments of the present disclosure. The method may be used to change the markers displayed by an updateable digital marker based on various factors or inputs, such that the displayed virtual images change accordingly for the mobile device 102.

In box 502, a proximity of the mobile device is determined to a location of a digital marker display is determined for an update for updateable digital markers. For example, the first digital marker display 314 associated with the children's cereal box determines a proximity of the mobile device 102 to a location of the first digital marker display 314. The first digital marker display 314 may use the determined proximity of the mobile device 102 to the children's cereal box to update an updateable digital marker.

In box 504, a display of an updateable digital marker is updated. For example, the first digital marker display 314 updates it's display to display a digital marker that corresponds to a virtual arrow pointing from the children's cereal to the health-oriented cereal. The update may be based on a mobile device user action, a mobile device user input, a mobile device user profile, a timer for alternating between a variety of digital markers, a communication between the mobile device 102 and any digital marker display, and/or a communication from the content server 114 that manages the digital markers in the environment 120. Alternating between the variety of digital markers may promote displaying a variety of virtual images associated with price changes, specials, sales, etc.

For example, the update may be based on the mobile device user action of coming into close proximity with the first digital marker display 314 and a mobile device user profile that indicates the mobile device user has often purchased the health-oriented cereal but never purchased the children's cereal. In this example, the cereal maker may have selected for digital marker displays to be updated to display digital markers that correspond to virtual arrows pointing away from items that a specific customer never purchases to items that the specific customer frequently purchases. In contrast, when the first digital marker display 314 detects a proximity of a second customer whose mobile device user profile indicates occasional purchases of the children's cereal, the first digital marker display 314 updates from the digital marker that corresponds to the virtual arrow to display a digital marker that corresponds to a price discount image.

The update may be based on a communication between the mobile device 102 and the first digital marker display 314, such as a first mobile device 102 communicating its unique mobile device identifier to the first updateable digital marker 314. Based on this communication, the first digital marker display 314 may embed the unique mobile device identifier into a portion of the digital marker corresponding to the virtual arrow. Only the first mobile device 102 intended to display the virtual arrow will combine the digital marker for the virtual arrow with the unique mobile device identifier to produce the third virtual image 322 of the virtual arrow. A second mobile device 102 that does not recognize the unique mobile device identifier for the first mobile device 102 will not recognize the digital marker and therefore not display the virtual arrow. Alternatively, the digital marker display may communicate information to a specific mobile device 102 to enable the mobile device 102 to display a virtual image that is selected specifically for the specific mobile device 102.

The update may be based on a mobile device user input, such as an input list of items to retrieve from a warehouse. The list may be input to the content server 114 managing the digital markers for the environment 120 from the mobile device user input, from a graphic user interface, or from some other input for the manager of the content server 114 to use. The communication between the mobile device 102 and the digital marker displays 314-316 associated with the items to be retrieved may result in a display of virtual arrows that specify the order for traveling to the item locations based on the shortest distance for retrieving these items. For this example, the mobile device user inputs a list that includes a computer, a monitor, and a keyboard. The computer is located on a shelf in aisle 1, the monitor is located on a shelf in aisle 9, and the keyboard is located on a shelf in aisle 2. Retrieving the items in their listed order would result in the mobile device user traveling 8 aisles to retrieve the monitor after retrieving the computer, and traveling 7 aisles to retrieve the keyboard after retrieving the monitor, resulting in the mobile device user traveling a total of 15 aisles. After the mobile device 102 and the digital marker displays 314-316 identify where each of the items are located on the shelves in the warehouse, the virtual arrows first specify for the mobile device user to retrieve the computer in aisle 1, then to travel 1 aisle to retrieve the keyboard in aisle 2, and finally to travel 7 aisles to retrieve the monitor in aisle 9, resulting in the mobile device user traveling a total of only 9 aisles. Similar to the virtual arrows specifying the shortest distance to retrieve items, virtual arrows may also specify the shortest distance for distributing items, which the mobile device user may follow when stocking the shelves of the warehouse.

In box 506, a first updateable digital marker and a second updateable digital marker are alternated, wherein a first user interface associated with a first mobile device displays a first virtual image overlaid on the image of the environment, wherein the first virtual image is based on the first updateable digital marker, and wherein a second user interface associated with a second mobile device displays a second virtual image overlaid on the image of the environment, wherein the second virtual image is based on the second updateable digital marker. For example, the digital marker display 314 alternates between a first updateable digital marker that corresponds to the price discount image and a second updateable digital marker that corresponds to the virtual arrow. By alternating between digital markers, the digital marker display 314 enables the display 104 for the first mobile device 102 to display the virtual arrow overlaid above the children's cereal box, while the display 104 for the second mobile device 102 displays the price discount image overlaid above the children's cereal box.

In box 508, an image of an environment is captured. For example, the camera 118 captures the image 122 of the environment 120 that includes the shelf 302, the items 304-310, and the markers 312-316 in the grocery store.

In box 510, at least one of a plurality of updateable digital markers is detected in the image of the environment. For example, the mobile device 102 detects that the first digital marker display 314 is displaying an updateable digital marker that corresponds to the virtual arrow.

In box 512, a virtual image is displayed overlaid on the image of the environment, wherein the virtual image is based on the at least one of the plurality of updateable digital markers. For example, the display 104 displays the virtual arrow overlaid above the third item 308, which is the children's cereal box.

The mobile device 102 may display virtual images based on a combination of digital markers. For example, the markers used to display the virtual images of the refrigerator may be digital markers. Furthermore, a mobile device user may select from options offered by digital marker displays to view an unlimited number of virtual items. For example, if a mobile device user is viewing virtual images of a refrigerator based on digital markers, the display 104 may offer selections to view different refrigerator options, such as different colors of the refrigerator or different manufacturers or models of the refrigerator. The digital marker displays update the displayed digital markers to the digital markers that correspond to the user selections, and the display 104 depicts the virtual images based on the user selection. A mobile device user may use a combination of digital marker displays to evaluate the appearance of a selected item in a particular environment. For example, a mobile device user places digital marker displays in a corner of their kitchen and selects various refrigerator models from options presented by the display 104. The digital marker displays respond by displaying the appropriate digital markers, which the mobile device user sees in the display 104 as a virtual image of the selected refrigerator in their kitchen where the actual refrigerator would be located. The mobile device user may examine the virtual refrigerator image from numerous angles to determine whether to change the model or color of the refrigerator to match the kitchen.

In box 514, the display of the virtual image overlaid on the image of the environment is adjusted. For example, the mobile device 102 uses a digital compass and an accelerometer to adjust the display of the price discount above the children's cereal box. Adjusting the display of virtual images may be helpful when the mobile device 102 is moved in relation to its initial orientation. For example, the display 104 of the mobile device 102 may overlay the price discount image as information that is fifteen inches high and depicted above an eighteen inch high children's cereal box. When the mobile device 102 is ten feet away from the children's cereal box, the display 104 may offer a perspective that enables the mobile device user to identify each of the items 304-310 on the shelf 302 and to read the third virtual image 322 that includes the price discount information.

However, when the mobile device user moves closer to the children's cereal box, the display 104 may offer a perspective that depicts only the children's cereal box and a small amount of room above the children's cereal box. In this situation, the display 104 does not have sufficient room in its current perspective to display both the children's cereal box and the price discount image in their original proportions. In response, the mobile device 102 may adjust the display of the price discount image to overlay the children's cereal box so that the mobile device user may still read all of the information included in the price discount image. Alternatively, the mobile device 102 may reduce the relative size of the price discount image that is depicted above the children's cereal box to fit the available free space above the children's cereal box, but not reduced so much so that the mobile device user may not read all of the information included in the price discount image.

Figure 6:
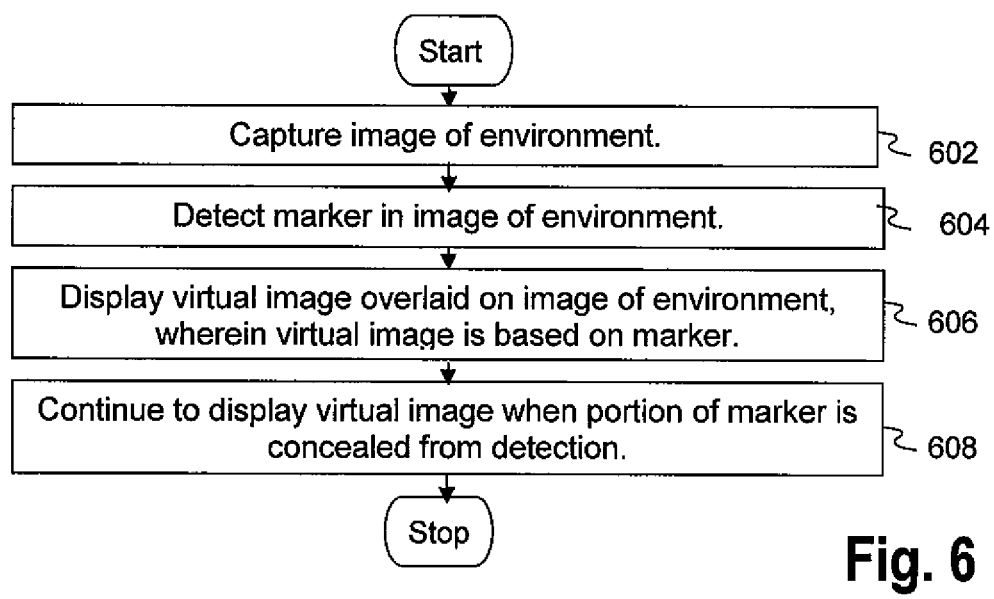
FIG. 6 shows yet another flowchart of a method for markers to implement augmented reality according to some embodiments of the present disclosure.

FIG. 6 shows yet another flowchart of a method for markers to implement augmented reality according to some embodiments of the present disclosure. The mobile device 102 can use the method to continue displaying a virtual image when a portion of a marker is concealed from detection.

In box 602, an image is captured of an environment. For example, the camera 118 captures the image 122 of the environment 120 that includes the shelf 302, the items 304-310, and the markers 312-316 in the grocery store.

In box 604, a marker is detected in the image of the environment. For example, the mobile device 102 detects the physical marker 312 on the first item 304 in the image 122 of the environment 120.

In box 606, a virtual image is displayed overlaid on the image of the environment, wherein the virtual image is based on the marker. For example, the mobile device 102 displays the first virtual image 318 overlaid on the image 122 of the environment 120, wherein the first virtual image 318 is based on the physical marker 312 on the first item 304, the box of candy.

Virtual images overlaid on the image 122 of the environment 120 may include colors that indicate a level of matching. For example, if a user inputs desired features, including a desired price, for a refrigerator via the keys 106 of the mobile device 102, the content server 114 determines which refrigerator models most closely match the desired features. The content server 114 associates virtual images of different overlay colors with the image of each refrigerator depending upon the level of matching. For example, the mobile device 102 overlays the color red over the image of a first refrigerator that matches few of the desired features, overlays the color yellow over the image of a second refrigerator that matches some of the desired features, and overlays the color green over the image of a third refrigerator that matches most of the desired features. The user may scan the environment 120 that includes the three refrigerators and quickly identify the refrigerator that matches most of the desired features and price by simply observing the colors overlaid as virtual images on the images of the refrigerators.

In box 608, the virtual image is continued to be displayed when a portion of the marker is concealed from detection. For example, the display 104 continues to display the first virtual image 318 when a portion of the physical marker 312 is concealed from detection, such as when another customer in the grocery store reaches to examine the first item 304 and the other customer's hand conceals a portion of the physical marker 312 on the box of candy. The display 104 may continue to display the virtual image based on detecting a remaining portion of the marker, matching a remaining portion of the marker to the marker, or continuing to detect at least one sub-marker that is a portion of the marker. For example, the remaining portion of the physical marker 312 that is not concealed by the other customer's hand may be sufficient for the mobile device 102 to identify the first virtual image 318 that corresponds to the physical marker 312. The mobile device 102 may use a matching algorithm to match the remaining portion of the marker that is not concealed by the other customer's hand to the physical marker 312. In another example, the physical marker 312 may be composed of multiple identical sub-markers, each of which corresponds to the first virtual image 318. Even when the other customer's hand conceals some of these sub-markers, any of the remaining sub-markers that remained uncovered is sufficient by itself to be used by the mobile device 102 to identify the corresponding first virtual image 318. In some instances, even if the physical marker 312 is completely concealed, the mobile device 102 may continue to display the first virtual image 318 for some period of time. The mobile device 102 may use environmental views of other location reference points, such as the shelf 302 or the edge of the first item 304, to properly locate the first virtual image 318 over the image 122 of the environment 120 until the physical marker 312 is no longer concealed.

While most examples depict the mobile device 102 as a mobile phone with the display 104 displaying virtual images, one of skill in the art would recognize that the mobile device 102 may also use a headset with goggles, lenses, glasses, or similar viewing devices as discussed, or other coupled display devices. In some instances, the mobile device 102 may also use a projector to project the virtual images onto the environment 120, such as a projector in the mobile device 120 or a projector coupled with the mobile device 102. This projection would also "display" the virtual images as described and claimed herein.

Figure 7:
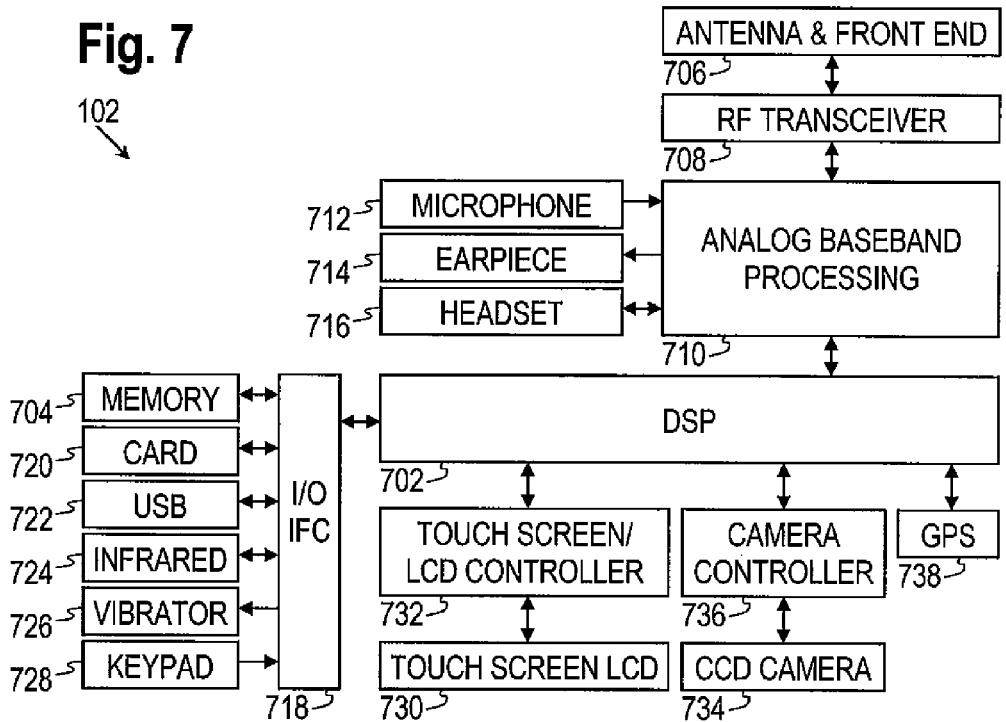
FIG. 7 shows a block diagram of an illustrative mobile device.

FIG. 7 shows a block diagram of the mobile device 102. While a variety of known components of mobile devices 102 are depicted, in an embodiment a subset of the listed components and/or additional components not listed may be included in the mobile device 102. The mobile device 102 includes a digital signal processor (DSP) 702 and a memory 704. As shown, the mobile device 102 may further include an antenna and front end unit 706, a radio frequency (RF) transceiver 708, an analog baseband processing unit 710, a microphone 712, an earpiece speaker 714, a headset port 716, an input/output interface 718, a removable memory card 720, a universal serial bus (USB) port 722, an infrared port 724, a vibrator 726, a keypad 728, a touch screen liquid crystal display (LCD) with a touch sensitive surface 730, a touch screen/LCD controller 732, a charge-coupled device (CCD) camera 734, a camera controller 736, and a global positioning system (GPS) sensor 738. In an embodiment, the mobile device 102 may include another kind of display that does not provide a touch sensitive screen. In an embodiment, the DSP 702 may communicate directly with the memory 704 without passing through the input/output interface 718.

The DSP 702 or some other form of controller or central processing unit operates to control the various components of the mobile device 102 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The antenna and front end unit 706 may be provided to convert between wireless signals and electrical signals, enabling the mobile device 102 to send and receive information from a cellular network or some other available wireless communications network or from a peer mobile device 102. In an embodiment, the antenna and front end unit 706 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 706 may include antenna tuning and/or impedance matching components, RF power amplifiers, and/or low noise amplifiers.

The RF transceiver 708 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 710 and/or the DSP 702 or other central processing unit. In some embodiments, the RF Transceiver 708, portions of the antenna and front end 706, and the analog baseband processing unit 710 may be combined in one or more processing units and/or application specific integrated circuits (ASICs).

The analog baseband processing unit 710 may provide various analog processing of inputs and outputs, for example analog processing of inputs from the microphone 712 and the headset port 716 and outputs to the earpiece speaker 714 and the headset port 716. To that end, the analog baseband processing unit 710 may have ports for connecting to the built-in microphone 712 and the earpiece speaker 714 that enable the mobile device 102 to be used as a cell phone. The analog baseband processing unit 710 may further include a port for connecting to a headset or other hands-free microphone and speaker configuration. The analog baseband processing unit 710 may provide digital-to-analog conversion in one signal direction and analog-to-digital conversion in the opposing signal direction. In some embodiments, at least some of the functionality of the analog baseband processing unit 710 may be provided by digital processing components, for example by the DSP 702 or by other central processing units.

The DSP 702 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 702 may perform modulation, coding, interleaving, and spreading, and for a receiver function the DSP 702 may perform despreading, deinterleaving, decoding, and demodulation. In another embodiment, for example in an orthogonal frequency division multiplex access (OFDMA) technology application, for the transmitter function the DSP 702 may perform modulation, coding, interleaving, inverse fast fourier transforming, and cyclic prefix appending, and for a receiver function the DSP 702 may perform cyclic prefix removal, fast fourier transforming, deinterleaving, decoding, and demodulation. In other wireless technology applications, yet other signal processing functions and combinations of signal processing functions may be performed by the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB port 722 and the infrared port 724. The USB port 722 may enable the mobile device 102 to function as a peripheral device to exchange information with a personal computer or other computer system. The infrared port 724 and other optional ports such as a Bluetooth interface or an IEEE 802.11 compliant wireless interface may enable the mobile device 102 to communicate wirelessly with other nearby mobile devices and/or wireless base stations.

The input/output interface 718 may further connect the DSP 702 to the vibrator 726 that, when triggered, causes the mobile device 102 to vibrate. The vibrator 726 may serve as a mechanism for silently alerting the user to any of various events such as an incoming call, a new text message, and an appointment reminder.

The keypad 728 couples to the DSP 702 via the I/O interface 718 to provide one mechanism for the user to make selections, enter information, and otherwise provide input to the mobile device 102. Another input mechanism may be the touch screen LCD 730, which may also display text and/or graphics to the user. The touch screen LCD controller 732 couples the DSP 702 to the touch screen LCD 730.

The CCD camera 734 enables the mobile device 102 to take digital pictures. The DSP 702 communicates with the CCD camera 734 via the camera controller 736. The GPS sensor 738 is coupled to the DSP 702 to decode global positioning system signals, thereby enabling the mobile device 102 to determine its position. In another embodiment, a camera operating according to a technology other than Charge Coupled Device cameras may be employed. Various other peripherals may also be included to provide additional functions, e.g., radio and television reception.

Figure 8:
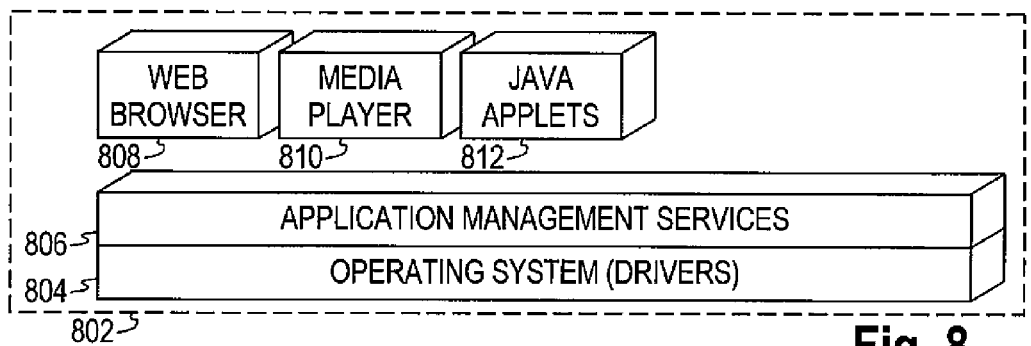
FIG. 8 shows a block diagram of an illustrative software configuration for a mobile device.

FIG. 8 illustrates a software environment 802 that may be implemented by the DSP 702. The DSP 702 executes operating system software 804 that provides a platform from which the rest of the software operates. The operating system generally provides processing resource management support. The operating system software 804 provides drivers for the mobile device hardware to make standardized interfaces available to application software. The operating system software 804 may transfer control between applications running on the mobile device 102. Alternatively, an application management services 806 component may transfer control between applications running on the handset mobile device 102. Also shown in FIG. 8 are a web browser 808 application, a media player 810, and application JAVA applets 812. The web browser 806 application configures the mobile device 102 to operate as a web browser, allowing the user to enter information into forms and select links to retrieve and view web pages. The media player 810 application configures the mobile device 102 to retrieve and play audio or audiovisual media on its own output components. The JAVA applets 812 may configure the mobile device 102 to provide games, utilities, and other functionality on the mobile device 102.

Figure 9:
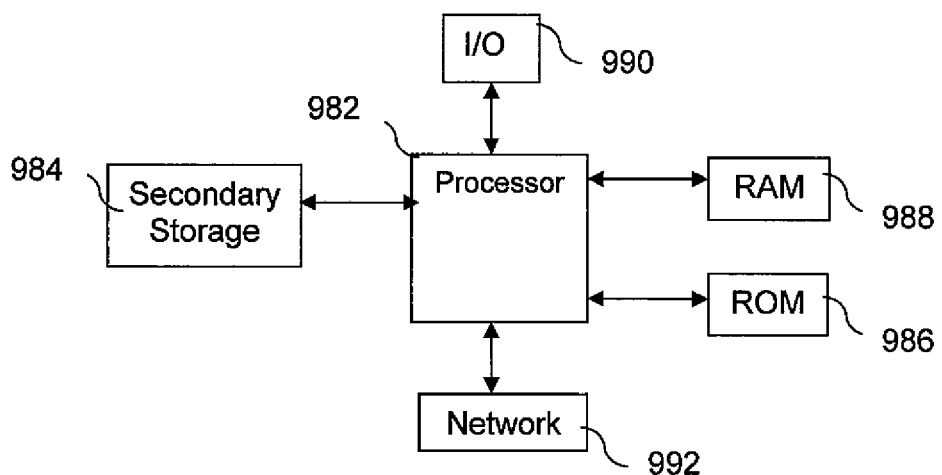
FIG. 9 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 9 illustrates a typical, general-purpose computer system, suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) devices 990, and network connectivity devices 992. The processor may be implemented as one or more CPU chips.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage. The RAM 988 is used to store volatile data and perhaps to store instructions. Access to both ROM 986 and RAM 988 is typically faster than to secondary storage 984.

I/O devices 990 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 992 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 992 may enable the processor 982 to communicate with an Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave.

Such information, which may include data or instructions to be executed using processor 982 for example, may be received from and outputted to the network, for example, in the form of a computer data baseband signal or signal embodied in a carrier wave. The baseband signal or signal embodied in the carrier wave generated by the network connectivity devices 992 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992. While only one processor 982 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for markers to implement augmented reality, comprising:
   at least one processor;
   a camera associated with a mobile device to capture an image of an environment;
   a plurality of instructions in a memory, when executed by the at least one processor, that detect at least one of a plurality of updateable digital markers in the image of the environment;
   a user interface associated with the mobile device to display a virtual image overlaid on the image of the environment, wherein the virtual image is based on the at least one of the plurality of updateable digital markers; and
   a digital marker display configured to determine a proximity of the mobile device to a location of the digital marker display, determine an update for the at least one of a plurality of updateable digital markers, and update a display of the at least one of the plurality of updateable digital markers.

2. The system of claim 1, further comprising a digital compass and an accelerometer to promote the instructions adjusting the display of the virtual image overlaid on the image of the environment.

3. The system of claim 1, wherein the digital marker display is further configured to alternate between a first updateable digital marker and a second updateable digital marker, wherein a first user interface associated with a first mobile device displays a first virtual image overlaid on the image of the environment, wherein the first virtual image is based on the first updateable digital marker, and wherein a second user interface associated with a second mobile device displays a second virtual image overlaid on the image of the environment, wherein the second virtual image is based on the second updateable digital marker.

4. The system of claim 1, wherein an update to the at least one of a plurality of updateable digital markers is based on at least one of a mobile device user input, a mobile device user profile, a mobile device user action, and a communication between the mobile device and the digital marker display.

5. The system of claim 1, wherein the memory is associated with at least one of the mobile device and a server in communication with the mobile device.

6. The system of claim 1, further comprising a database comprising the plurality of digital markers and a plurality of virtual images, wherein each of the plurality of virtual images is associated with at least one of the plurality of digital markers, and wherein the user interface displays the virtual image based on accessing the database.

7. The system of claim 1, wherein the mobile device is one of a mobile phone, a mobile telecommunication device, a mobile handset, a personal digital assistant, a mobile computer, a handheld gaming device, a wireless mobile device, a pager, a mobile computer, a portable computer, a tablet computer, a laptop computer, a digital camera, a digital music player, and a digital calculator.

8. The system of claim 1, wherein each of the plurality of updateable digital markers comprises at least one of an asymmetrical pattern, a moving marker, a two dimensional bar code, a color light pattern, a primary marker assigned to a marker hierarchy, a secondary marker assigned to the marker hierarchy, and a dependent marker assigned to the marker hierarchy.

9. The system of claim 1, wherein the virtual image is at least one of an image, navigational information, an advertisement, information about an item in the image of the environment, and a plurality of colors that indicate a level of matching.

* * * * *